United States Patent [19]

Strobach et al.

[11] Patent Number: 4,862,263
[45] Date of Patent: Aug. 29, 1989

[54] ARRANGEMENT FOR OPTIMIZED WEIGHTING OF TRANSMITTED TRANSFORMATION COEFFICIENTS IN TRANSFORAMTION CODERS FOR THE PURPOSE OF MINNIMIZING CONVOLUTION DISTORTIONS

[75] Inventors: Peter Strobach, Roehrbach; Herbert Hoelzlwimmer, Munich; Walter Tengler, Friedberg, all of Fed. Rep. of Germany

[73] Assignee: Siemens Aktiengesellschaft, Berlin and Munich, Fed. Rep. of Germany

[21] Appl. No.: 103,111

[22] Filed: Sep. 30, 1987

[30] Foreign Application Priority Data

Sep. 30, 1986 [DE] Fed. Rep. of Germany ....... 3633185

[51] Int. Cl.$^4$ ............................................. H04N 7/133
[52] U.S. Cl. ..................................... 358/135; 364/725
[58] Field of Search ...................... 358/133, 135, 136; 364/725; 375/27

[56] References Cited

U.S. PATENT DOCUMENTS

| | | | |
|---|---|---|---|
| 4,672,441 | 6/1987 | Hoelzlwimmer | 358/135 |
| 4,698,689 | 10/1987 | Tzou | 358/135 |
| 4,709,394 | 11/1987 | Bessler | 364/725 |
| 4,718,104 | 1/1988 | Anderson | 358/133 |

Primary Examiner—Howard W. Britton

[57] ABSTRACT

An arrangement for optimized weighting of transmitted transformation coefficients in transformation coders for the purpose of minimizing convolution distortions in the transformation coding of image signals for the purpose of a data reduction and/or for the purpose of achieving a prescribed channel rate, has weighting circuitry whereby coefficients to be transmitted are additionally subjected to a weighting or windowing; and the selection of suitable weighting factors which effect a minimization of the convolution distortions in the reconstructed image is executed, dependent on the plurality of coefficients to be transmitted.

1 Claim, 6 Drawing Sheets

ARRANGEMENT FOR OPTIMIZED WEIGHTING OF TRANSMITTED TRANSFORMATION COEFFICIENTS IN TRANSFORAMTION CODERS FOR THE PURPOSE OF MINNIMIZING CONVOLUTION DISTORTIONS

BACKGROUND OF THE INVENTION

The present invention is directed to an arrangement for optimized weighting of transmitted transformation coefficients in transformation coders for the purpose of minimizing convolution distortions.

It is often necessary in transformation coding of images to transmit only a sub-quantity of all transformation coefficients for the purpose of a further data reduction or for the purpose of observing a prescribed channel rate. For example, in video conference coders which are based on the principle of transformation coding, a buffer controller means can reduce the transmission rate by prescribing a number less than all of the transformation coefficients to be transmitted. See, for example, Hoelzlwimmer, et al. U.S. Pat. No. 4,672,441. "Method And Apparatus For Picture Data Reduction For Digital Video Signals". This restriction in the number of coefficients to be transmitted can lead to convolution distortions in the reconstructed signal at the output of the receiver, such distortions being visible in an especially disturbing fashion, particularly at the edges of the visible objects.

A method for resolving this problem has hitherto not been known from the prior art.

SUMMARY OF THE INVENTION

The object of the present invention is to create an arrangement for selecting and transmitting coefficients which can minimize the distortion.

This object of the invention is achieved by an arrangement which weights the transmitted coefficients.

SUMMARY OF THE DRAWINGS

The present invention shall be set forth in detail below with reference to a number of Figs. which respectively relate to preferred exemplary embodiments of the invention.

DESCRIPTION OF THE PREFERRED EMBODIMENT

The convolution distortions can be avoided when the coefficients to be transmitted are subjected to a weighting or windowing in accord with the invention. The selection of the suitable weighting factors which effect a minimization of the convolution distortions in the reconstructed image is made in response to the plurality of coefficients to be transmitted.

Figure 1:
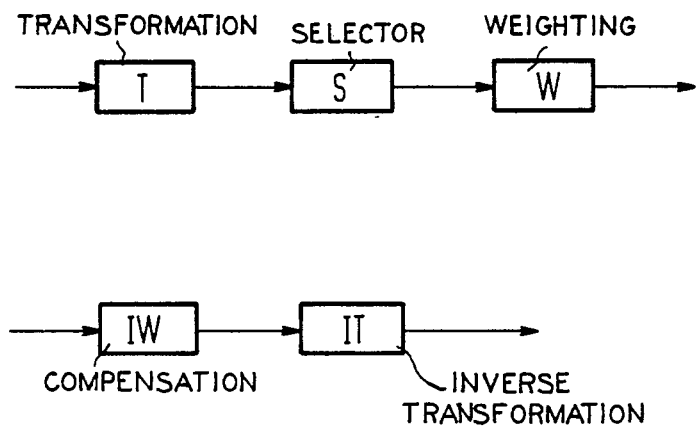
FIG. 1 shows a schematic illustration of an arrangement for optimized weighting of transmitted transformation coefficients for the purpose of minimizing convolution distortions in accordance with the present invention.

FIG. 1 shows a schematic illustration, in the form of a block circuit diagram, of such an arrangement for optimized weighting of transmitted transformation coefficients. A transmitter to which an image signal is supplied comprises structure having a series circuit composed of a transformation stage T, a selector stage S for the selection of the transformation coefficients to be transmitted, and a weighting stage W for weighting the transformation coefficients to be transmitted, with a receiver, at the receiving side of the channel, comprising a series circuit composed of a compensation stage IW for the compensation or partial compensation of the weightings applied in the transmitter and a transformation stage IT for inverse transformation for reconstruction of the image signal.

Figure 2:
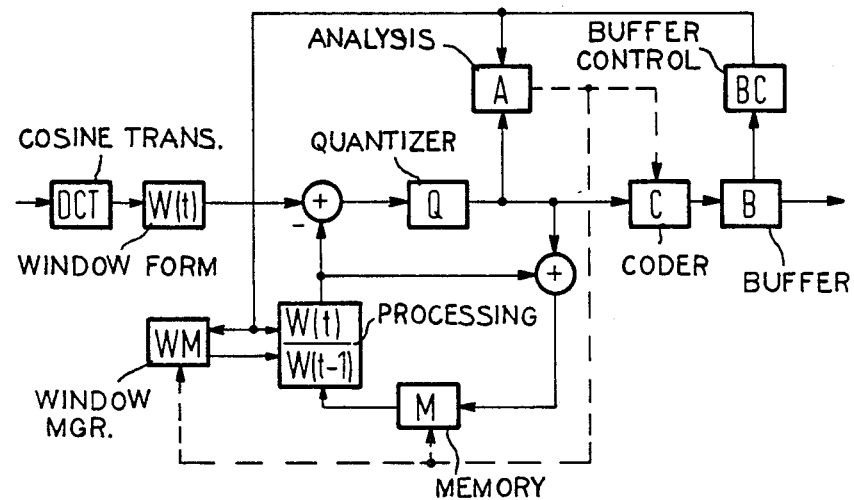
FIG. 2 shows a detailed block circuit diagram of a first exemplary embodiment of a transmitter comprising a "window compensation" following the DPCM memory within the transmitter.

FIG. 2 shows a first exemplary embodiment of a transmitter comprising a weighting or "window compensation" following the DPCM memory. The image signal is initially supplied to a discrete cosine transformation DCT in this transmitter. This transformation is followed by a stage W(t) for the execution of the windowing operation for image scenes at time t. The weighting stage W(t), where t designates the image number in a scene, performs an element by element multiplication of each DCT coefficient with an associated weighting factor. The output of this stage W(t) is connected to a first input of a subtraction element whose output is connected to a quantizer Q. The output of the quantizer Q is connected to an analysis stage A, to a coder C and to a first input of a summer element. The output of the summer element is connected to the input of a DPCM memory M, to which an output signal of an analysis stage A, namely a class signal, is supplied via a side input. The class signal is also supplied to a window manager WM.

Figure 8:
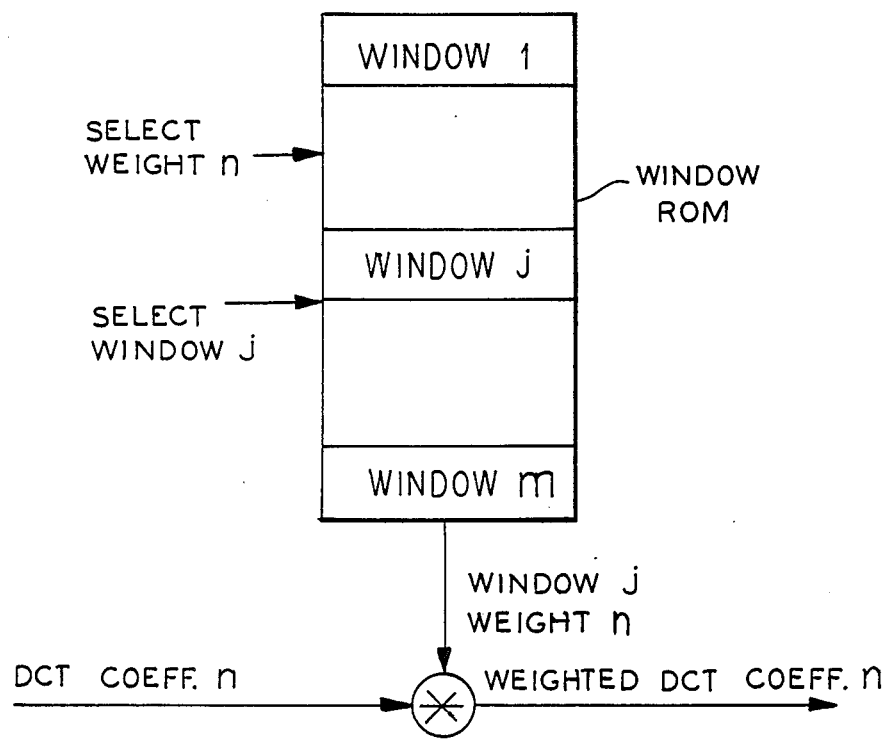
FIG. 8 is a block diagram of a weighting stage.
Figure 9:
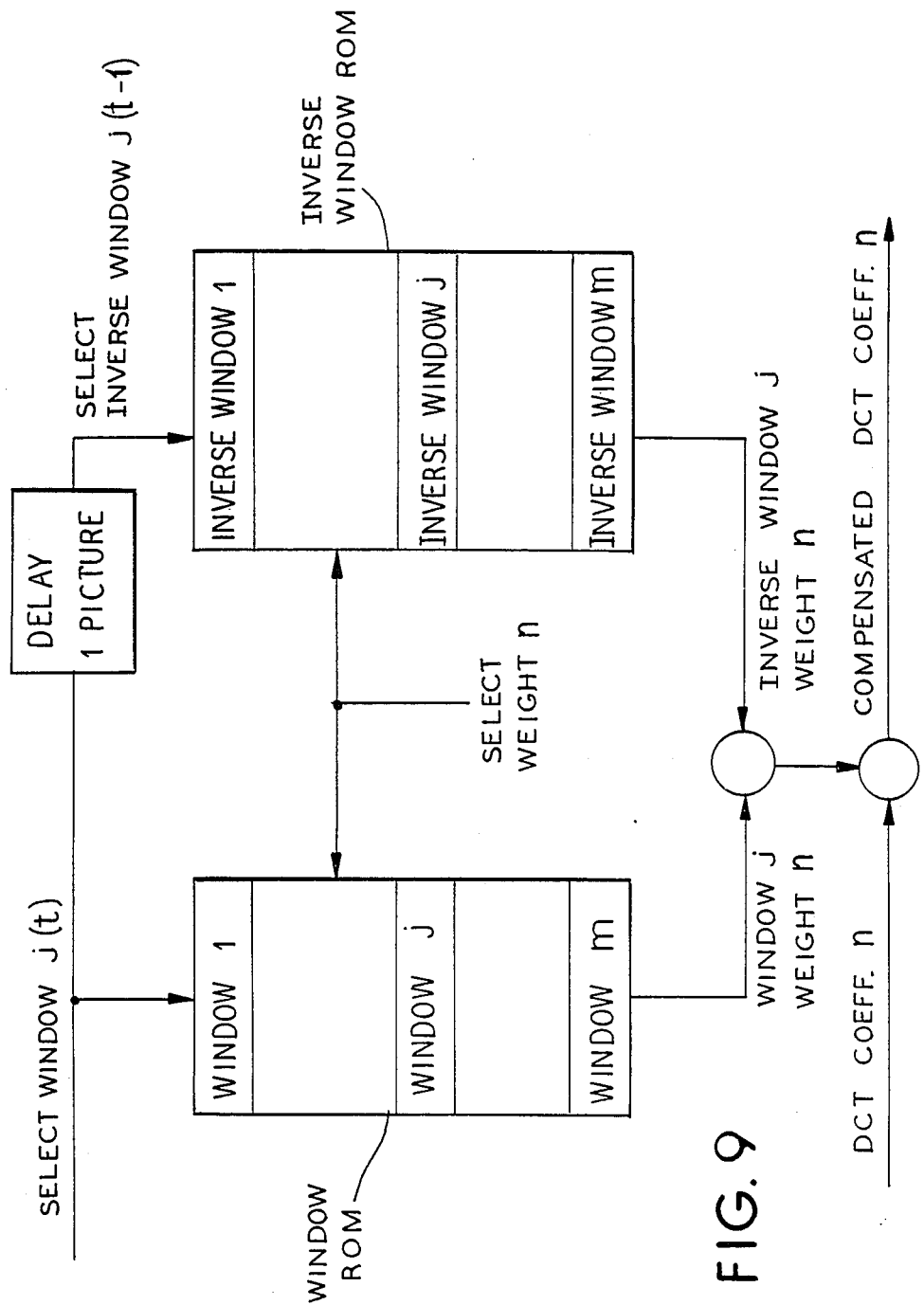
FIG. 9 is a block diagram of a compensation stage.

The output of the DPCM memory M is connected to an input of a processing stage W(t)/W(t−1) which is supplied with an output signal of the window manager WM via a further input. The window manager controls the compensation process in the DPCM loop, as described hereinafter in connection with FIGS. 8 and 9. One output of the compensation stage is connected to the second input of the subtraction element and is also connected to the further input of the summer element. The output of the coder C is connected to the input of a buffer B whose output leads to the channel. A further output of the buffer B is connected to an input of a buffer controller BC whose output is connected to a second input of the analysis stage A, to a further input of the window manager WM, and to a further input of the compensation stage $W(t)/W(t-1)$. The buffer control unit BC can select different windows stored in a ROM, in order to achieve a desired data rate or image quality, as described in connection with FIG. 8.

In operation, the discrete cosine transform (DCT) converts the signal into a series of coefficients. The window weighting stage W(t) selects the portions of the input signal coefficients corresponding to the picture to be transmitted, in effect constituting a window for passing (in successive frames) only these portions of the input signal. From the passed portions of the signal, the subtractor subtracts portions of the signal which are constant from each frame such signal portions corresponding to constant or non-moving images. This is accomplished by reading out from the memory M data corresponding to information stored in accordance with the content of previous frames, and processing such data in the compensation stage, under control of the window manager, WM, so as to present to the subtractor a signal corresponding to the differential, i.e. the variant or moving part of the picture to be transmitted. The memory M and its processor thus function as a DPCM or differential pulse code modulation memory.

The select window j signal (see FIG. 8 and FIG. 9), which addresses a specific window in a window ROM is stored for the specific image t and for a specific subblock. A sub-block is a 2-dimensional area of typically 16*16 or 8*8 adjacent pixels of the image. In the next image $t+1$, the stored selected window j signal addresses an inverse window ROM (see FIG. 9) via the inverse window j signal in the compensation stage. The window manager is thus a data RAM which delays the selected window j signal, which is used as the select inverse window j signal in the next image $t+1$. The compensation stage is necessary to achieve a good prediction in the case where different windows are used for a specific block for two succeeding pictures.

Figure 10A:
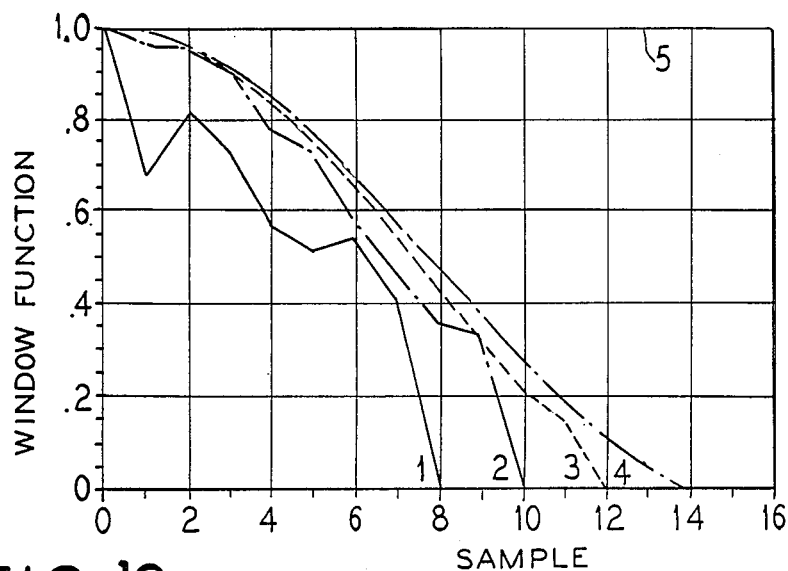
FIG. 10a is a series of graphs showing an example of different windows stored in the weighting stage.
Figure 10B:
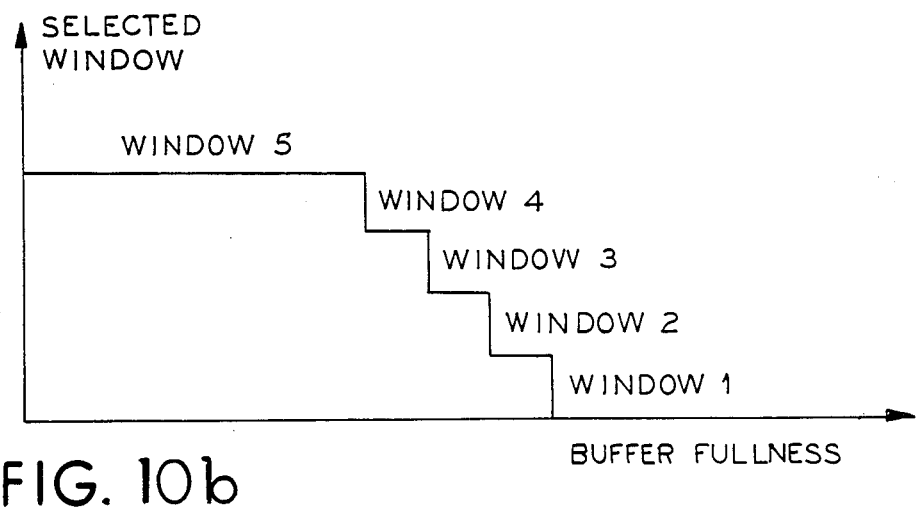
FIG. 10b is a diagram illustrating the control characteristics of the buffer control unit.

The buffer control unit operates in a similar way as the apparatus described in the aforesaid Hoelzlwimmer patent with the following modification. The extent to which the buffer is full does not determine the number of transmitted coefficients, but selects one out of m windows in the window ROM. All windows have a gain equal to one for the DC coefficient, but differ for higher spectral components, as shown in FIG. 10a. The windows are selected by the buffer control unit BC according to the control characteristic shown in FIG. 10b. As shown in FIG. 10b, the different windows of FIG. 10a are selected in response to the quantity of data in the buffer, or the buffer fullness.

The variant data produced at the output of the subtractor is quantized by the quantizer Q, coded in the conventional manner in a coder C, and transmitted through the output buffer B. The coding used is controlled by the class of the picture being transmitted, as determined by the class analyzer A. Thus, an entirely new picture, with no invariant parts in comparison to the previous frame, may be recognized in response to a signal produced by the buffer control unit BC in accordance with the content of the buffer B. In this way the coding of the data being transmitted can be adjusted to be optimum for the condition of the transmitted data.

Figure 3:
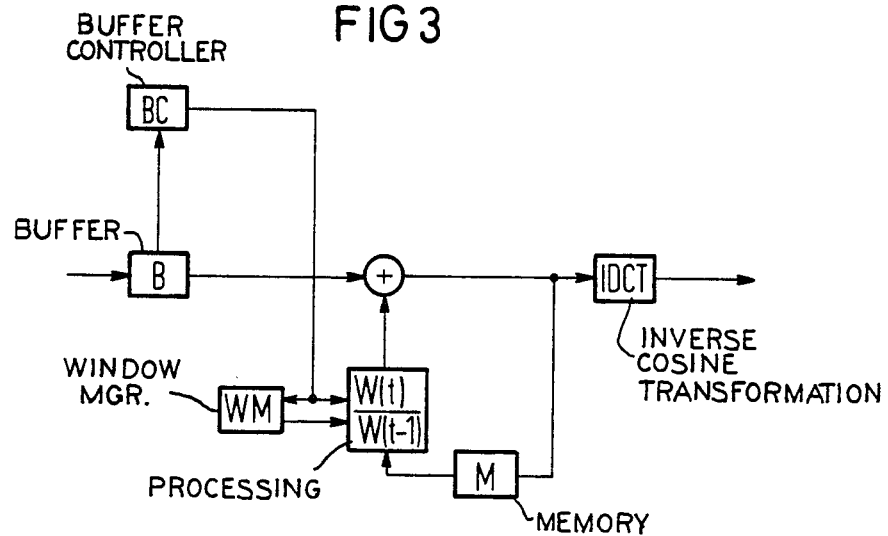
FIG. 3 shows a detailed block circuit diagram of a first exemplary embodiment of a receiver comprising a "window compensation" following the DPCM memory within the receiver.

FIG. 3 shows a block circuit diagram of a first exemplary embodiment of a receiver comprising "window compensation" following the DPCM memory. The channel at the input is connected to the input of a buffer B, from which one output is connected to a first input of an element and a further output is connected to the input of a buffer controller BC. The output of the summer element is connected to a stage IDCT for execution of an inverse, discrete cosine transformation to produce an output comprising a reconstructed image signal. Further, the output of the summer element is connected to the input of a DPCM memory M, whose output is connected to a compensation stage $W(t)/W(t-1)$. W(t) represents a window at time t. One output of this compensation stage is connected to the further input of the summer element. The output of the buffer controller BC which outputs a window selection signal is connected to an input of a window manager WM and to a further input of the processing stage, and one output of the window manager WM is connected to a third input of the processing stage.

By this means, fully restored signals are made available to the output, through the IDCT unit. The invariant parts of the picture are added to the transmitted signal in the summer, having been stored in the DPCM memory M. The window manager WM responds to the buffer control unit BC to supply, for example, no content from the DPCM memory when the picture content is entirely new.

Figure 4:
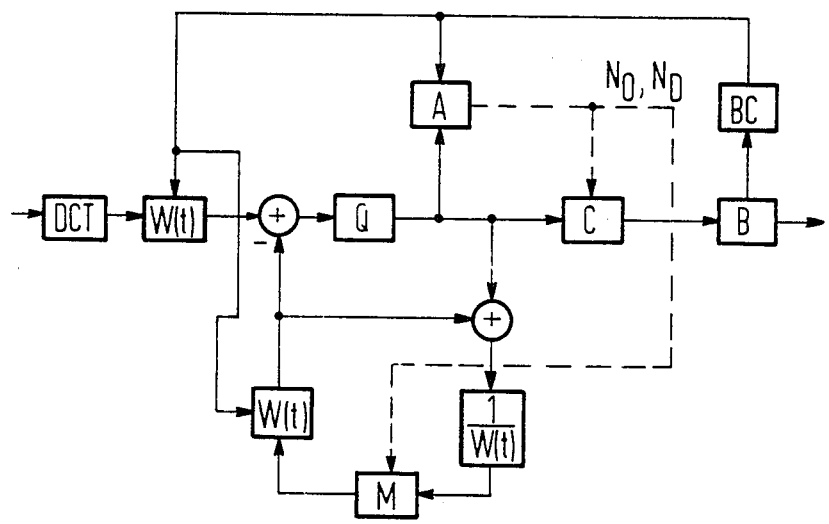
FIG. 4 shows a detailed block circuit diagram of a second exemplary embodiment of a transmitter comprising a "window" compensation following the DPCM memory within the transmitter.
Figure 5:
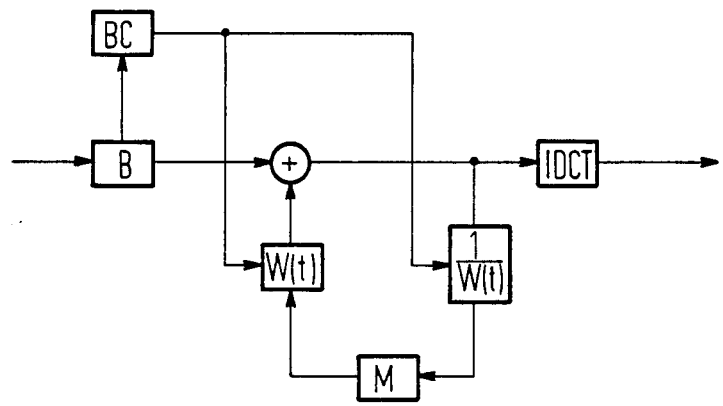
FIG. 5 shows a detailed block circuit diagram of a second exemplary embodiment of a receiver comprising a "window compensation" following the DPCM memory within the receiver.

The object of the present invention can be resolved in a simple way with a transmitter and with a receiver according to FIGS. 2 or 3, while FIG. 4 and FIG. 5 show alternative exemplary embodiments of the transmitter and receiver.

In FIG. 4, which shows a modified transmitter, the arrangement conforms to that of FIG. 2, except the compensation for the DPCM memory is split into two parts, one part prior to the memory M and the other part subsequent to the memory M. This reduces the complexity of the apparatus by making the window manager WM unnecessary.

The arrangement of FIG. 5 is similar to FIG. 3, with the window manager WM omitted, and the compensation split between units at the input and output of the memory M, respectively.

The exemplary embodiments shown in FIGS. 2 through 5 are of such a nature that they enable an optimized weighting in collaboration with the DCT hybrid coder already disclosed in the aforesaid Hoelzlwimmer patent.

Figure 6:
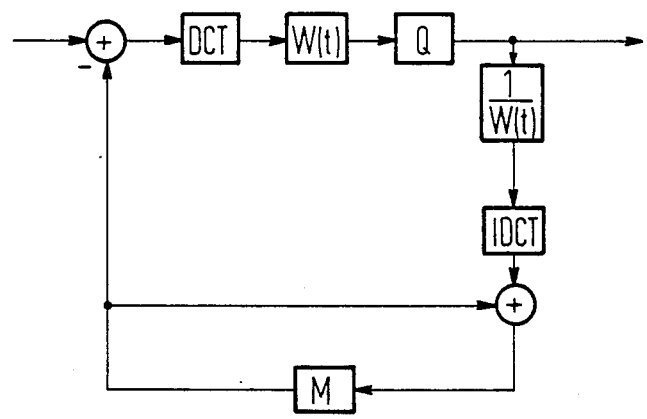
FIG. 6 shows a block circuit diagram of an exemplary embodiment of a transmitter comprising transformation within the DPCM loop.

FIG. 6 shows the block circuit diagram of a transmitter according to a further exemplary embodiment of the invention. The transformation in this transmitter is executed within the DPCM loop. This circuit arrangement is executed in an especially computationally efficient way since it contains significantly fewer elements in comparison to the circuit arrangements described above. In the arrangement of FIG. 6, which shows the transmitter apparatus, the discrete cosine transformation unit DCT is located downstream of the subtractor, and the memory M stores signals corresponding to the already transmitted parts of arriving input signals.

The weighting unit W(t) is located after the subtractor, instead of before it, and a compensation unit and an inverse discrete cosine transformation unit is connected between the output of the quantizer Q and the input of the memory unit M, whereby the signals presented to the input of the memory M, for storage, correspond in character to the arriving input signals.

Figure 7:
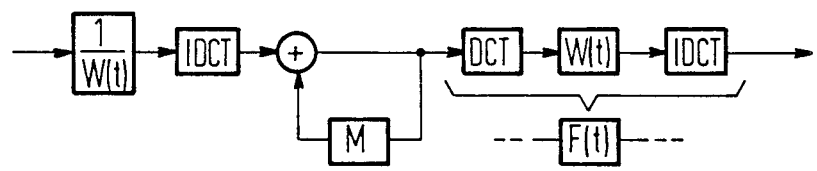
FIG. 7 shows a block circuit diagram of an exemplary embodiment of a receiver for operation with the transmitter comprising transformation within the DPCM loop according to FIG. 6, whereby either a configuration DCT-W(t)-IDCT or the equivalent filter F(t) is utilized dependent on the realization conditions at the output of the receiver.

The corresponding receiver is shown in FIG. 7. A compensation unit and inverse cosine transformation unit process the transmitted signal before it is applied to the summing unit for restoration of the signal, by incorporating data stored in the memory M. At the output of the summer, another discrete cosine transformation unit is provided, to condition the signals for the weighting unit W(t), after which an inverse discrete cosine transformation is performed by IDCT to supply the restored output signals.

Alternatively, a filter unit F(t) may be employed instead of the forward and inverse cosine transformation and the intervening processing step.

It will be apparent that various modifications and/or additions may be made in the apparatus of the invention without departing from the essential feature of novelty involved, which are intended to be defined and secured by the appended claims.

It is claimed:

1. A method for optimized weighting of transmitted transformation coefficients in a transformation coder, for the purpose of minimizing distorting of transform coefficients in the transform coding of image signals, for the purpose of a reduction in the transmission rate for such coefficients, including the steps of windowing the coefficients to be transmitted, and selecting the weighting factors which effect a minimization of the convolution distortions in the reconstructed image in accordance with the coefficients to be transmitted.

* * * * *